US011593352B2

(12) United States Patent
Abouzour et al.

(10) Patent No.: US 11,593,352 B2
(45) Date of Patent: Feb. 28, 2023

(54) CLOUD-NATIVE OBJECT STORAGE FOR PAGE-BASED RELATIONAL DATABASE

(71) Applicant: SAP SE, Walldorf (DE)

(72) Inventors: Mohammed Abouzour, Waterloo (CA); Gunes Aluc, Kitchener (CA); Ivan Bowman, Hammonds Plains (CA); Xi Deng, Kitchener (CA); Nandan Marathe, Pune (IN); Sagar Ranadive, Kitchener (CA); Muhammed Sharique, Camberley (GB); John Smirnios, Waterloo (CA)

(73) Assignee: SAP SE, Walldorf (DE)

( * ) Notice: Subject to any disclaimer, the term of this patent is extended or adjusted under 35 U.S.C. 154(b) by 128 days.

(21) Appl. No.: 17/197,693

(22) Filed: Mar. 10, 2021

(65) Prior Publication Data

US 2022/0164335 A1    May 26, 2022

(30) Foreign Application Priority Data

Nov. 23, 2020   (IN) .............................. 202011050825

(51) Int. Cl.
*G06F 16/00*   (2019.01)
*G06F 16/23*   (2019.01)
*G06F 16/28*   (2019.01)

(52) U.S. Cl.
CPC ...... *G06F 16/2365* (2019.01); *G06F 16/2379* (2019.01); *G06F 16/284* (2019.01)

(58) Field of Classification Search
CPC . G06F 16/2365; G06F 16/2379; G06F 16/284
See application file for complete search history.

(56) References Cited

U.S. PATENT DOCUMENTS 11,288,138 B1* 3/2022 Freilich ............... G06F 11/1451
11,422,730 B1* 8/2022 Chawla ................. G06F 3/0632
2011/0231374 A1* 9/2011 Jain ..................... G06F 16/1752
707/E17.005

(Continued)

FOREIGN PATENT DOCUMENTS

EP           2973054 B1    5/2018

OTHER PUBLICATIONS

Anonymous: "Wikipedia—SAP IQ", Oct. 20, 2020 (Oct. 20, 2020), XP055905335, Retrieved from the Internet: URL: https://en.wikipedia.org/w/index.php?title=SAP_IQ&oldid=984448767, [retrieved on 2022-0325], 7pgs.

(Continued)

*Primary Examiner* — Noosha Arjomandi
(74) *Attorney, Agent, or Firm* — Buckley, Maschoff & Talwalkar LLC

(57) ABSTRACT

Systems and methods include determination of a first logical page number of a first database page to be persisted, identification of a first blockmap page associated with the first logical page number, determination, from the first blockmap page, of a block number associated with the first logical page number, determination that the block number is an object key, determination, in response to the determination, that the block number is an object key, determination of a first object key to associate with the first logical page number, and writing of the first database page to the object store using the first object key.

20 Claims, 12 Drawing Sheets

(56) References Cited

U.S. PATENT DOCUMENTS

| | | | |
|---|---|---|---|
| 2015/0134900 A1* | 5/2015 | Lin | G06F 16/217 |
| | | | 711/113 |
| 2018/0150485 A1* | 5/2018 | Tripathy | G06F 16/1748 |
| 2021/0004431 A1* | 1/2021 | Li | G06V 30/245 |
| 2022/0019574 A1* | 1/2022 | Villafuerte | G06F 16/285 |
| 2022/0083422 A1* | 3/2022 | Curtis-Maury | G06F 13/1668 |
| 2022/0147490 A1* | 5/2022 | Shivani | G06F 16/178 |
| 2022/0164335 A1* | 5/2022 | Abouzour | G06F 16/2365 |

OTHER PUBLICATIONS

Anonymous: "Multiversion concurrency control", Nov. 12, 2020 (Nov. 12, 2020), XP055905185, Retrieved from the Internet: URL:https://en.wikipedia.org/w/index.php?title=Myultiversion_concurrency_control&oldid=988404847, [retrieved on Mar. 25, 2022], 3pgs.

"Communication: The Extended European Search Report", European Patent Office, dated Apr. 5, 2022 (Apr. 5, 2022),for European Application No. 21191596.2-1222, 12pgs.

Abouzour, Mohammed et al., "Bringing Cloud-Native Storage to SAP IQ", Proceedings of the 27th Annual International Conference on Mobile Computer and Networking, ACMPUB27, New York, NY, USA, Jun. 9, 2021 (Jun. 9, 2021), XP058645484, DOI: 10.1145/3448016.3457563, ISBN: 978-1-4503-8343-1 (pp. 2410-2422, 13 total pages).

\* cited by examiner

| Clock | Event | Description | Active Set |
|---|---|---|---|
| 50 | Checkpoint | Metadata including the active sets of keys are flushed to disk | ∅ |
| 60 | $W_1$ allocation | Key range 101-200 is allocated to $W_1$ | $W_1$: [101-200] |
| 70 | $T_1$ begins on $W_1$ | Objects with keys 101-130 are flushed; range is recorded in the RB bitmap of $T_1$ | $W_1$: [101-200] |
| 80 | $T_2$ begins on $W_1$ | Objects with keys 131-150 are used by $T_2$; range is recorded in the RB bitmap of $T_2$ | $W_1$: [101-200] |
| 90 | $T_1$ commits | RF/RB bitmaps of $T_1$ are flushed to disk; active set is updated | $W_1$: [131-200] |
| 100 | $T_3$ begins on $W_1$ | Objects with keys 151-160 are flushed; range is recorded in the RB bitmap of $T_3$ | $W_1$: [131-200] |
| 110 | Coordinator crashes | | ∅ |
| 120 | Coordinator recovers | Active set is recovered | $W_1$: [131-200] |
| 130 | $T_2$ rolls back | Objects with keys 131-150 are garbage collected; active set is not updated | $W_1$: [131-200] |
| 140 | $W_1$ crashes | | $W_1$: [131-200] |
| 150 | $W_1$ restarts | Outstanding allocations for $W_1$ are garbage collected on the coordinator | ∅ |

*FIG. 12*

CLOUD-NATIVE OBJECT STORAGE FOR PAGE-BASED RELATIONAL DATABASE

CROSS-REFERENCE TO RELATED APPLICATIONS

This application claims benefit of and priority under 35 U.S.C. § 119(a) to Indian Provisional Patent Application No. 202011050825, filed Nov. 23, 2020, the contents of which are hereby incorporated by reference in their entirety for all purposes.

BACKGROUND

Software vendors are increasingly moving their offerings to the cloud, e.g., as Software-as-a-Service (SaaS). Cloud-based implementations provide vendors with elasticity of compute and storage resources, built-in fault-tolerance and disaster recovery, and economies of scale. Users of cloud-based implementations benefit from a pay-as-you-go pricing model and a user experience which is generally preferable to local or on-premise deployments.

Traditional disk-based relational database management systems are designed to persist data using storage devices that provide strong consistency guarantees. For example, if a transaction writes data to a block of a POSIX-compliant file system-based storage device (e.g., a fixed disk drive) and then commits, then subsequent transactions which read that block are expected to retrieve the latest version of the data that was written to that block. Therefore, deployment of such a relational database management system on the cloud requires the use of file system-based cloud storage resources which provide similar strong consistency guarantees. Such resources are expensive, and their use may significantly diminish any cost advantages which would otherwise result from cloud deployment of the database management system.

Cloud-based object stores are considerably less expensive than file system-based cloud storage resources and may also provide enhanced durability, improved elasticity, and higher throughput. However, cloud-based object stores are not suitable for use with traditional disk-based relational database management systems because cloud-based object stores often provide eventual, but not strong, consistency guarantees. In other words, a traditional disk-based relational database management system which uses an object store instead of file system-based storage would eventually provide a database client with the most up-to-date version of an updated object but may provide stale versions of the object in the meantime.

Moreover, traditional disk-based relational database management systems regularly require in-place updates of persisted database pages. That is, a transaction may require updating a particular version of a database page, in which case the location of the page in the file-based storage system is determined and the page is updated at the location. Not all cloud-based object stores allow updates to a stored object with strong read-after-write consistency, and therefore are not compatible with page update protocols of traditional disk-based relational database management systems.

What is needed is a relational database management system that is capable of writing data to and reading data from eventually-consistent object stores.

BRIEF DESCRIPTION OF THE DRAWINGS

FIG. 12 is a table of events for describing garbage collection and recovery after a database node crash according to some embodiments.

DETAILED DESCRIPTION

Figure 1:
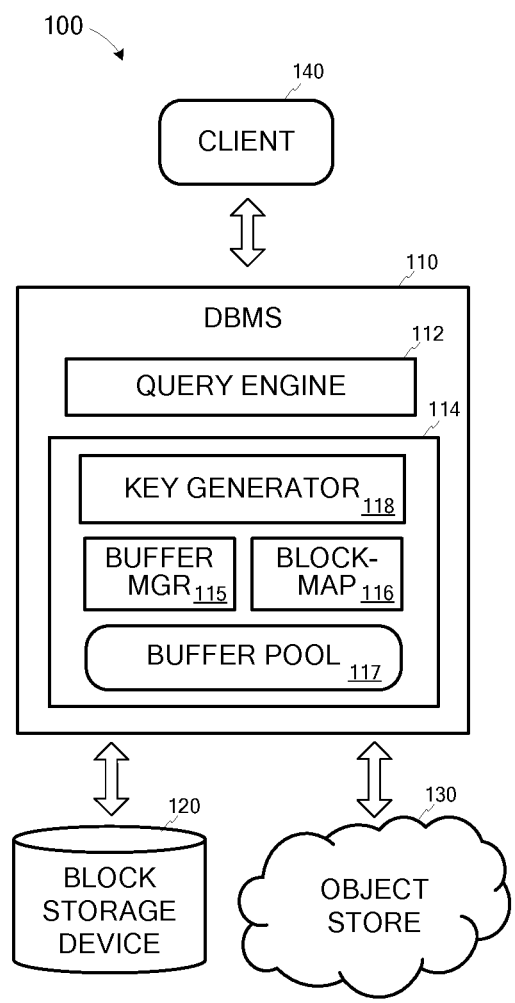
FIG. 1 is a block diagram of a page-based relational database management system providing native block-based storage and cloud object storage according to some embodiments.

Some embodiments store data in a distributed, consistent database management system including object stores. Embodiments overcome the eventual consistency guarantees of object stores by generating unique object IDs, which are distinguishable from block IDs, for each created or modified page and managing page data based on multi-version consistency control and blockmaps.

The operation of some traditional relational database management systems is based on a distinction between a logical (in-memory) representation of a data page and the physical (persisted) representation of the data page. The persisted form and location of a page is transparent to the query engine of the database system, which identifies pages based solely on their logical page numbers. Page persistence, update and retrieval is managed by a buffer manager disposed between the query engine and persistent storage devices. The buffer manager utilizes "blockmap"s to maintain mappings between logical numbers of database pages and block numbers which indicate the physical blocks of a file at which the database pages are stored. The file is located on one or more file-based storage devices (hereinafter referred to as "block storage devices") and these database pages will be referred to herein as belonging to a file-based database space.

In addition to the traditional functionality described above, embodiments described herein support database pages which are persisted as objects in a cloud-based object store. These database pages will be referred to herein as belonging to a cloud database space. For such pages, the blockmap maintains mappings between logical numbers of the database pages and object keys of cloud-based objects which store the database pages.

In response to reception of a request to retrieve a logical page, the buffer manager navigates the blockmap per typical protocols to identify a block number associated with the logical page. If the block number refers to a physical block stored on a block storage device, the page is retrieved from the block storage device based on the block number. However, if the block number is in a particular reserved numerical range (or exhibits some other predesignated characteristic), the buffer manager determines that the identified block number represents an object key and the page is retrieved from an object store using the object key.

Conventionally, when a new logical page of a file-based database space is to be written to a block storage device, the buffer manager accesses a freelist to identify suitable free physical blocks, writes the new logical page to the identified blocks, and updates the blockmap to identify the block number at which the page was written. Upon receiving an instruction to persist an update to this logical page, the buffer manager navigates the blockmap to identify the block number at which the corresponding physical page was written and updates the physical page in-place.

According to some embodiments, when a new logical page of a cloud database space is to be written, a unique object key is generated, and the new logical page is written to an object store using the unique object key. An update to an existing logical page of a cloud database space cannot be persisted as described above with respect to a logical page of a file-based database space, since, unlike a file, portions of an object cannot be re-written. Accordingly, to persist an update to an existing logical page of a cloud database space, another unique object key is generated, and the updated page is written to the object store as an object using the unique object key. Since the physical location of the page has changed, the blockmap is updated accordingly as will be described below.

By virtue of the foregoing, the freelist is only used in some embodiments to manage the storage of system data structures (which may be stored in block storage devices) and pages of any file-based database spaces. Since the freelist is typically a heavyweight data structure and a process contention point, this reduced reliance on the freelist may improve throughput and reduce required processing resources.

Cloud-based implementations of a database management system according to some embodiments may be distributed, in which each database node is a cloud-based server which can be elastically added and removed from the system. As will be described below, embodiments may provide for efficient allocation of object keys among writing nodes, and for persistence and recovery of these object keys.

A transaction manager of a database management system according to some embodiments may include mechanisms to track pages stored on object stores that are no longer needed, and to provide garbage collection thereof. Due to the reduced cost of maintaining stale page versions within cloud-based object storage, some embodiments further support frequent and near-instantaneous database snapshots. Also, in view of the latency of cloud-based object storage, some embodiments may include a read/write cache between the buffer manager and cloud-based object storage.

FIG. 1 is a view of system 100 according to some embodiments. System 100 includes database management system 110, which may be implemented using one or more computer servers and/or any suitable combination of computing hardware and software. One or more components of system 110 may be located remote from one another and one or more components may be allocated in a cloud-computing environment. Such a cloud computing environment may elastically allocate and de-allocate compute (e.g., virtual machines) and storage (e.g., file-based, block-based, object-based) resources depending on demand, cost and/or other factors.

Database management system 110 may comprise any query-responsive database system that is or becomes known, including but not limited to a structured-query language (i.e., SQL) relational database management system. According to some embodiments, system 100 is a columnar relational database management system designed for online analytical processing (OLAP) workloads and implements multi-version concurrency control (MVCC) with table-level versioning and snapshot isolation.

Generally, system 110 manages data of a database instance which is persisted in block storage device 120 and object store 130. Embodiments may utilize more than one block storage device and/or object store. As is known in the art, block storage device 120 persists system files and database pages which belong to any file-based database spaces managed by system 110. Object store 130, on the other hand, persists database pages which belong to any cloud-based database spaces managed by system 110. For example, object store 130 may include two different object stores provided by two different storage providers. Each object store may be associated with a separate cloud-based database space and may therefore persist database pages of its associated database space. Embodiments may allow a user to choose a storage provider based on price and performance characteristics, and to move data between different storage providers as needed.

System 110 executes queries received from client 140. Such queries may comprise create, read, update and delete operations associated with data of the database instance. Client 140 may comprise a server application which serves many users, and system 110 may in turn serve many such server applications. According to some embodiments, client 140 is a server application and both client 140 and system 110 are executed on a cloud platform which provides services thereto. Users may access client 140 via a Web-based user portal to the cloud platform.

Query engine 112 receives queries and requests associated logical pages from storage subsystem 114. Buffer manager 115 is responsible for locating the correct version of a logical page in buffer pool 117 or, if not located in buffer pool 117, from persisted storage 120 or 130. Buffer manager 115 may utilize blockmap 116 to determine whether a logical page in persisted in storage 120 or 130 as described above. When a page is read from persisted storage 120 or 130, it is cached in buffer pool 117. The page may be cached in buffer pool 117 in decompressed form.

In some embodiments, new pages are created in buffer pool 117. When a transaction modifies a page in buffer pool 117, it is marked as dirty. Buffer manager 115 maintains a list of all the dirty pages associated with active transactions. Before a transaction commits, all dirty pages associated with the transaction are flushed to persistent storage 120 or 130 depending on whether the pages are associated with a file-based database space or a cloud-based database space. A dirty page may also be flushed from buffer pool 117 if buffer manager needs to make room for a more recent page.

When a dirty page that belongs to a cloud-based database space is flushed from buffer pool 117, the dirty page is stored in object store 130 using a new unique object key generated by key generator 118. This unique key is recorded in the blockmap so that the flushed version of the page can be located on future lookups. Key generator 118 ensures that object keys are never reused and that appropriate metadata are persisted and restored across database restarts.

Figure 2:
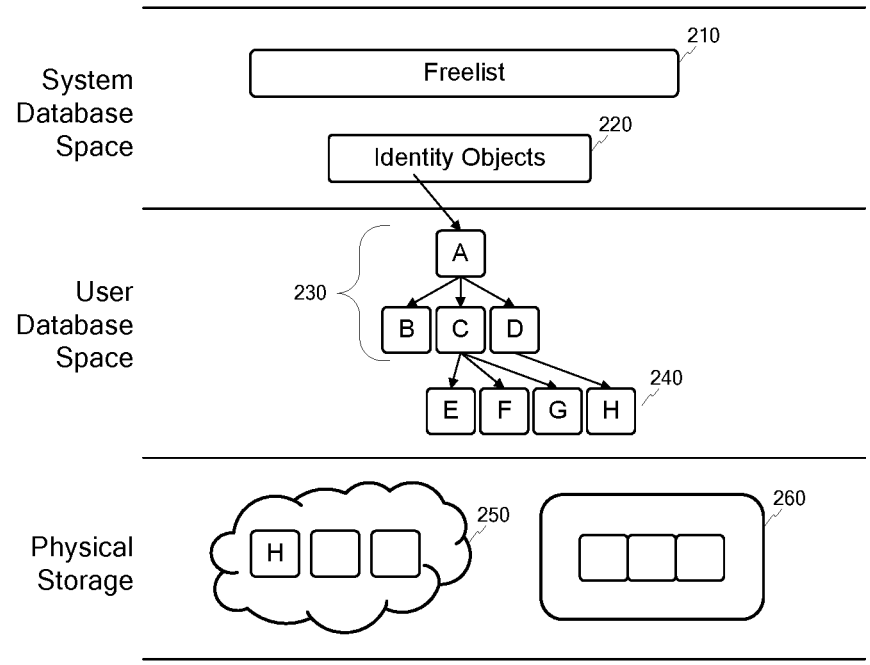
FIG. 2 illustrates components of a page-based relational database management system according to some embodiments.

FIG. 2 illustrates database spaces of a database management system according to some embodiments. A given database instance includes a system database space and one or more user-created (i.e., user) database spaces. The system database space includes a temporary system database space used to store hash tables, output of sort runs, etc., produced by the query engine. In a multiplex system as will be described below, the temporary system database space is used for sharing intermediate query results between nodes.

The main system database space stores freelist 210 and the system catalog. The freelist is a bitmap which represents the availability of allocated blocks across all database spaces in a database instance. For example, setting a bit in the freelist indicates that a block corresponding to the bit is in use, and a clear bit indicates that a block corresponding to the bit is available for use. The freelist is therefore used during writing of a new page to a block storage device (i.e., to identify free blocks to which the page will be written and to indicate that the blocks are in use after the page has been written to the blocks) and after deleting and garbage collecting a page from a block storage device (i.e., to indicate that the blocks which stored the page are now available for use).

Identity objects 220 are part of the system catalog stored in the system database space. Identity objects 220 may point to root pages of blockmaps which correspond to each user database space of a database instance. Data structures 210 and 220 of the main system database space are stored on devices with strong consistency guarantees (i.e., block storage devices) and therefore can be updated in-place.

A database instance may include one or more user database spaces, each of which may be defined by a user as a file-based database space or a cloud-based database space. Each user database space is associated with a set of corresponding blockmap objects, where each blockmap object (or blockmap) a tree of pages 230 pointing to the locations of persisted pages 240 of the corresponding database space. A blockmap for a cloud-based database space is associated with a tag or other indicator indicating that any new pages created in the database space are to be persisted in cloud object store 250. Accordingly, as will be described in more detail below, storage of such new pages includes generation of object keys (without consulting freelist 210) and using the generated object keys to store the pages in cloud object store 250.

Figure 3:
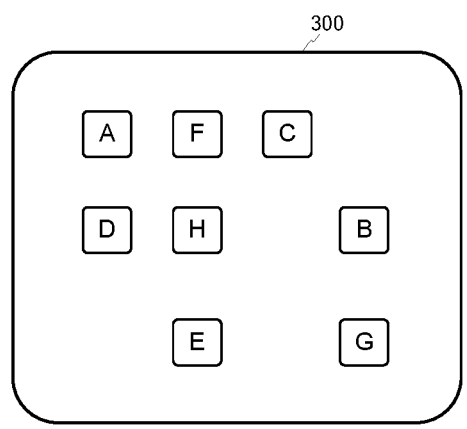
FIG. 3 illustrates a page buffer pool of a database system according to some embodiments.

Buffer pool 300 of FIG. 3 stores logical pages based on a caching policy. Buffer pool 300 may store one or more of blockmap pages 230 and data pages 240. As mentioned above, new pages are initially created in a buffer pool, and are associated with logical page numbers.

The first time a page corresponding to a logical page number is to be persisted, a buffer manager identifies a blockmap associated with the logical page number and an identity object 220 including a pointer to a root page of the identified blockmap. Next, it is determined whether the blockmap is associated with a cloud-based database space based on the aforementioned tag. If not, the freelist is consulted to determine a block number of block storage device 260 at which the corresponding physical page will be stored. The corresponding physical page is stored at the block number of block storage device 260 and a suitable page of the blockmap is updated to associate the logical page number with the block number as is known in the art.

However, if the blockmap associated with the logical page number is associated with a cloud-based database space, an object key is generated for use as the block number associated with the logical page. The corresponding physical page is stored as an object in object store 250 using the object key, and a suitable page of the blockmap is updated to associate the logical page number with the block number/object key. For example, newly-created page H is stored as an object in object store 250 using a newly-generated object key, and block map page D is updated to associate logical page H with this object key such that persisted page H may be located in the future if needed.

According to some embodiments, and to minimize changes to an existing format, the object keys generated for storage of cloud objects and the block numbers used to store pages in block storage devices are both 64-bit integers, but fall in different exclusive ranges. For example, the maximum physical block number may be $2^{48}-1$, while larger 64-bit numbers are reserved for object keys. The object keys are generated so as to be strictly monotonically increasing according to some embodiments. As will be described below, this property allows the use of key ranges as opposed to singleton keys for space and performance optimization during creation and garbage collection of pages in a multi-node architecture.

Figure 4A:
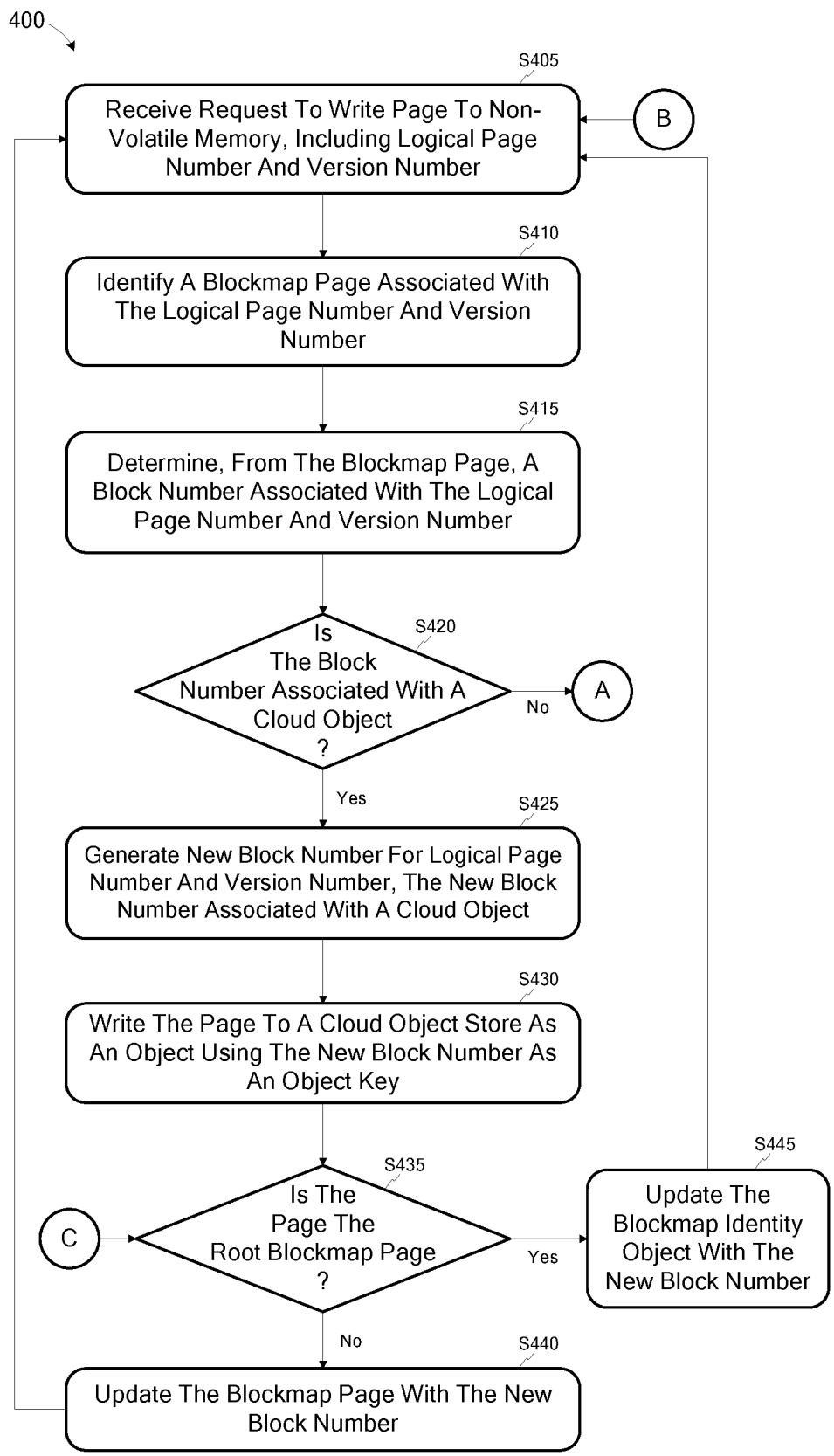
FIGS. 4A and 4B comprise a flow diagram of a process to selectively write database pages to block-based storage or cloud object storage according to some embodiments.
Figure 4B:
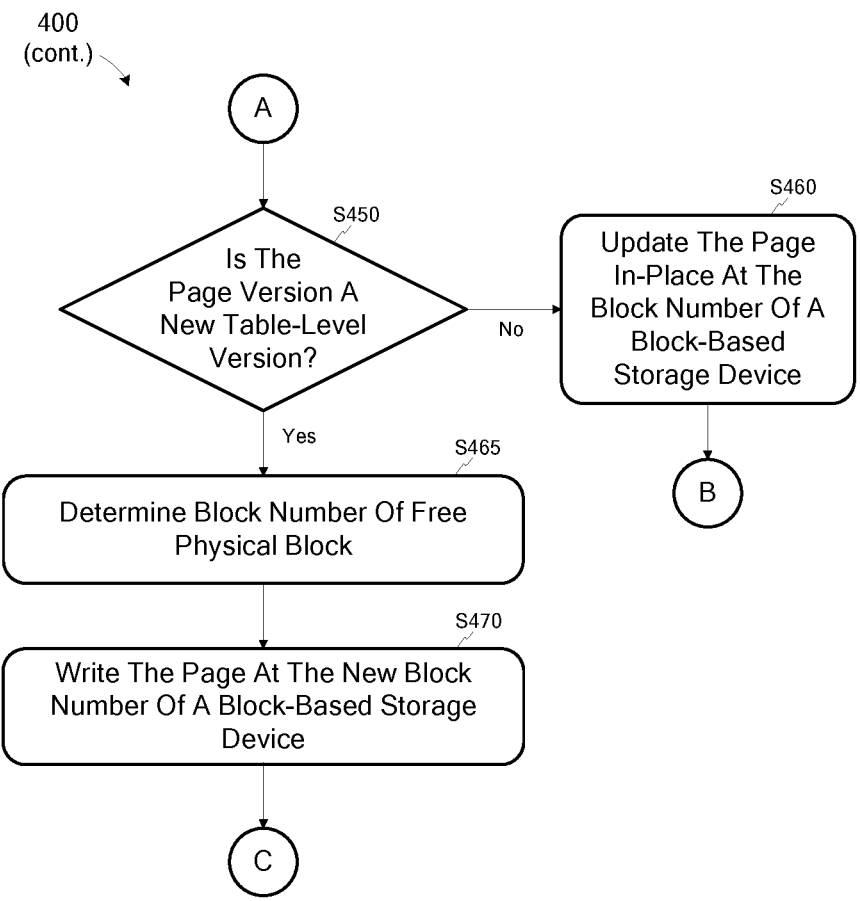

FIGS. 4A and 4B comprise a flow diagram of process 400 to selectively write database pages to block storage or cloud object storage according to some embodiments. Process 400 may be executed, for example, by components of a storage subsystem of a database management system.

Process 400 and all other processes mentioned herein may be embodied in program code read from one or more of non-transitory computer-readable media, such as a hard disk drive, a Flash drive, a DVD-ROM and a magnetic tape, and then stored in a compressed, uncompiled and/or encrypted format. The program code may be executed by one or more processing units such as but not limited to microprocessors, microprocessor cores, and microprocessor execution threads. In some embodiments, hard-wired circuitry may be used in place of, or in combination with, program code for implementation of processes according to some embodiments. Embodiments are therefore not limited to any specific combination of hardware and software.

Initially, at S405, a request is received to write a page to non-volatile memory. The request includes a logical page number and a version number, and may comprise a request to flush a dirty page of a buffer pool to persistent storage. As described above, such a request may occur prior to a transaction commit, or due to a cache eviction policy (e.g., the buffer manager needs to evict a last-recently-used page to allow room for a more recent page).

Figure 5:
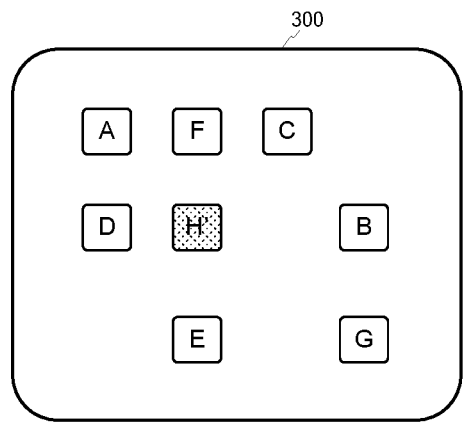
FIG. 5 illustrates a page buffer pool of a database system according to some embodiments.

It will be assumed that previously-mentioned page H is modified, or "dirtied" by a transaction. FIG. 5 illustrates buffer pool 300 showing resulting dirty page H'. According to some embodiments, the request received at S405 may comprise a request to flush page H' to persistent storage.

Returning to process 400, S410 comprises identification of a blockmap page associated with the logical page and the version of the request received at S405. According to some embodiments, S410 comprises determination of the user database space to which the logical page belongs, for example by consulting the system catalog. An identity object of the user database space is also identified from the system catalog. The identified identity object includes a pointer to a root page of a blockmap associated with the user database space. Starting with the root page, the blockmap pages are traversed based on the logical page number as is known in the art until a blockmap page which governs the logical page is reached at S410.

Referring to FIG. 2, S410 may comprise identifying root blockmap page A of blockmap pages 230 which correspond to the user database space of logical page H. Blockmap pages 230 are traversed until reaching blockmap page D which includes metadata concerning page H, including the object key of the persisted object storing page H.

Next, at S415, a block number associated with the logical page number and the version number is determined from the identified blockmap page. In traditional systems, the block number indicates a block of a block storage device at which a corresponding physical page is stored. Embodiments contemplate this possibility as well, in which the block number indicates a block of a block storage device at which the physical page is stored. However, as described above, the block number may also in some embodiments comprise an object key of an object store object in which the physical page is stored.

Returning to process 400, it is determined at S420 whether the determined block number is associated with a cloud object. In other words, S420 comprises a determination of whether the block number associated with the logical page number in the identified blockmap page is a block number of a block storage device or an object key of a cloud object. As described above, block number and object keys occupy different numeric ranges. Accordingly, S420 may comprise a determination of whether the determined block number is within the numeric range of object keys.

In the present example, the block number associated with page H in blockmap page D is an object key. Accordingly, flow proceeds from S420 to S425. At S425, a new block number is generated for the logical page. The new block number is within the numeric range associated with object keys. The new block number may be generated by an object key generator component as described above, and, unlike storage within a block storage device, the freelist need not be consulted during generation of the new block number.

Figure 6:
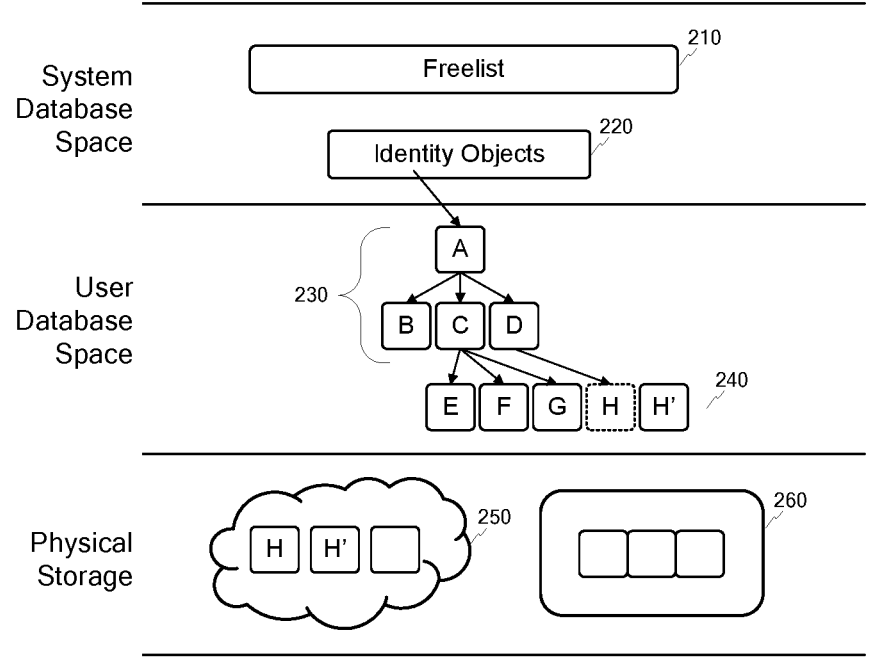
FIG. 6 illustrates components of a page-based relational database management system according to some embodiments.

The page is written to a cloud object store as an object at S430. The block number generated at S425 is used as an object key to write the page to the object store. FIG. 6 shows page H' written to cloud object store 250. As shown, the object storing page H' is different from the object storing page H. That is, the page H object is not overwritten at S430 because the page H object is associated with an object key which is different from the object key generated at S425 for page H'.

According to some embodiments, the object key used to write a page to the object store differs from the object key generated for the page at S425. For example, a prefix is constructed prior to storage by applying a computationally efficient hash function to the 64-bit object key generated for the logical page. The prefix is prepended to the 64-bit object key and the resulting value is used as the object key to the corresponding physical page in the object store. The use of such prefixes may avoid the throughput throttling imposed by some object stores on objects which share the same prefix.

Figure 7:
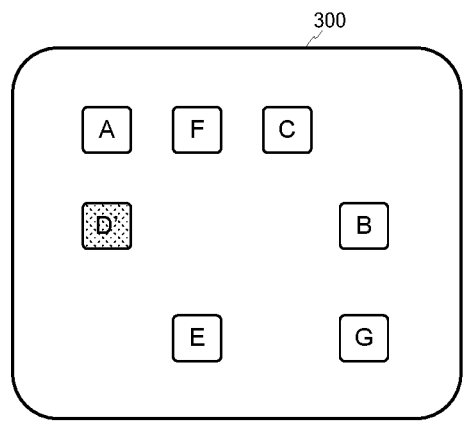
FIG. 7 illustrates a page buffer pool of a database system according to some embodiments.

As described above, the new object key should be written to a corresponding blockmap page to ensure that the persisted page can be acquired by future lookups. At S435, it is determined whether the logical page is the root page of the blockmap. If not, the identified blockmap page is updated at S440 with the new block number. For example, blockmap page D is updated to refer to the object key of the object storing page H'. This updated dirties blockmap page D in the buffer pool, resulting in page D' as shown in FIG. 7 and represented in FIG. 8.

Figure 8:
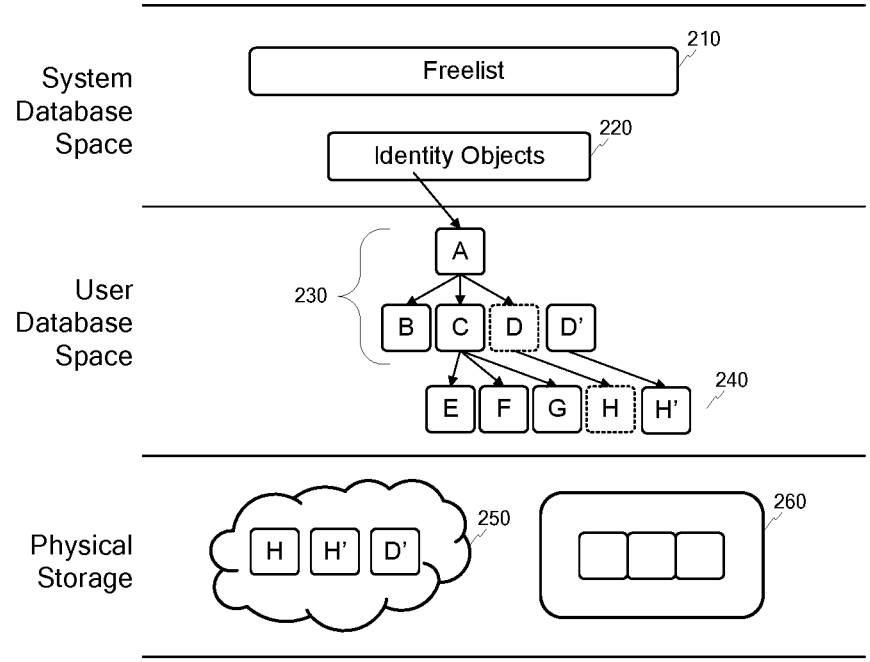
FIG. 8 illustrates components of a page-based relational database management system according to some embodiments.
Figure 9:
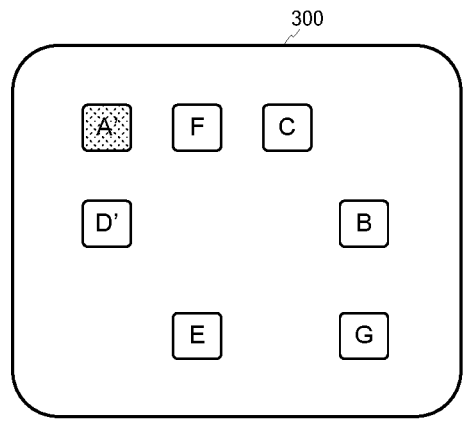
FIG. 9 illustrates a page buffer pool of a database system according to some embodiments.

Therefore, at a next flushing of dirty pages from buffer pool 300, S410 through S430 are executed as described above to identify blockmap page A, determine a block number/object key associated with blockmap page D, write blockmap page D' to object store 250 using a uniquely-generated object key as shown in FIG. 8. At S435, it is determined that blockmap page D is not the root blockmap page and flow continues to S440 to update blockmap page A. This update dirties page A of buffer pool 300 as shown in FIG. 9.

Figure 10:
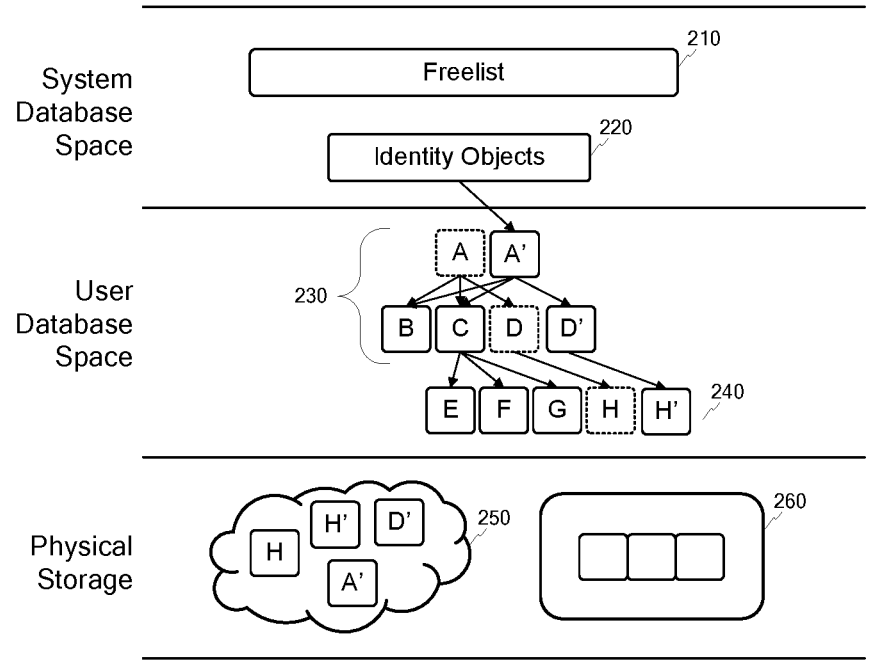
FIG. 10 illustrates components of a page-based relational management database system according to some embodiments.

At a next flushing of dirty pages from buffer pool 300, S410 through S430 are executed as described above to write blockmap page A' to object store 250 using a uniquely-generated object key as shown in FIG. 10. Since the written page is the blockmap root page, flow proceeds from S435 to S445 to update the identity object corresponding to the blockmap with the object key of stored object A'. The identity object is stored on a block storage device and is therefore updated in-place at S445.

As also shown in FIG. 10, logical pages A, D and H are marked so that when the transaction which modified page H commits, the pages can be garbage collected from object store 250 if desired.

Returning to process 400, flow proceeds from S420 to S450 if it is determined that the block number of a logical page to be written does not correspond to an object store (i.e., the block number is in the range of block storage device block numbers). At S450, it is determined whether the logical page reflects a new table-level version or merely an update to the logical page of the current table-level version. If the latter, the page is simply updated in-place per traditional processes at S460. That is, the persisted page stored at the block number of a block storage device is overwritten with data of the updated page. Flow then returns to S405.

If the logical page to be flushed reflects a new table-level version, the freelist is consulted at S465 to determine a block number of a free physical block of a block storage device at which the page may be persisted. The page is written to the block of the block storage device at S470. Flow then continues to S435 to update the blockmap page associated with the logical page with the new block number and continues as described above.

Accordingly, as in the traditional block-based storage model, embodiments update a page of a file-based database space in-place (i.e., on disk) if the table-level version has not changed. In contrast, a logical page of a cloud database space is versioned every time the page is written out to an object store. However, for logical pages of both file-based and cloud database spaces, a new version of a corresponding identity object is added to the catalog if a logical page is updated to a new table-level version. Also for all logical pages, a page does not need to be physically versioned on update as long as the page remains in the buffer pool.

Figure 11:
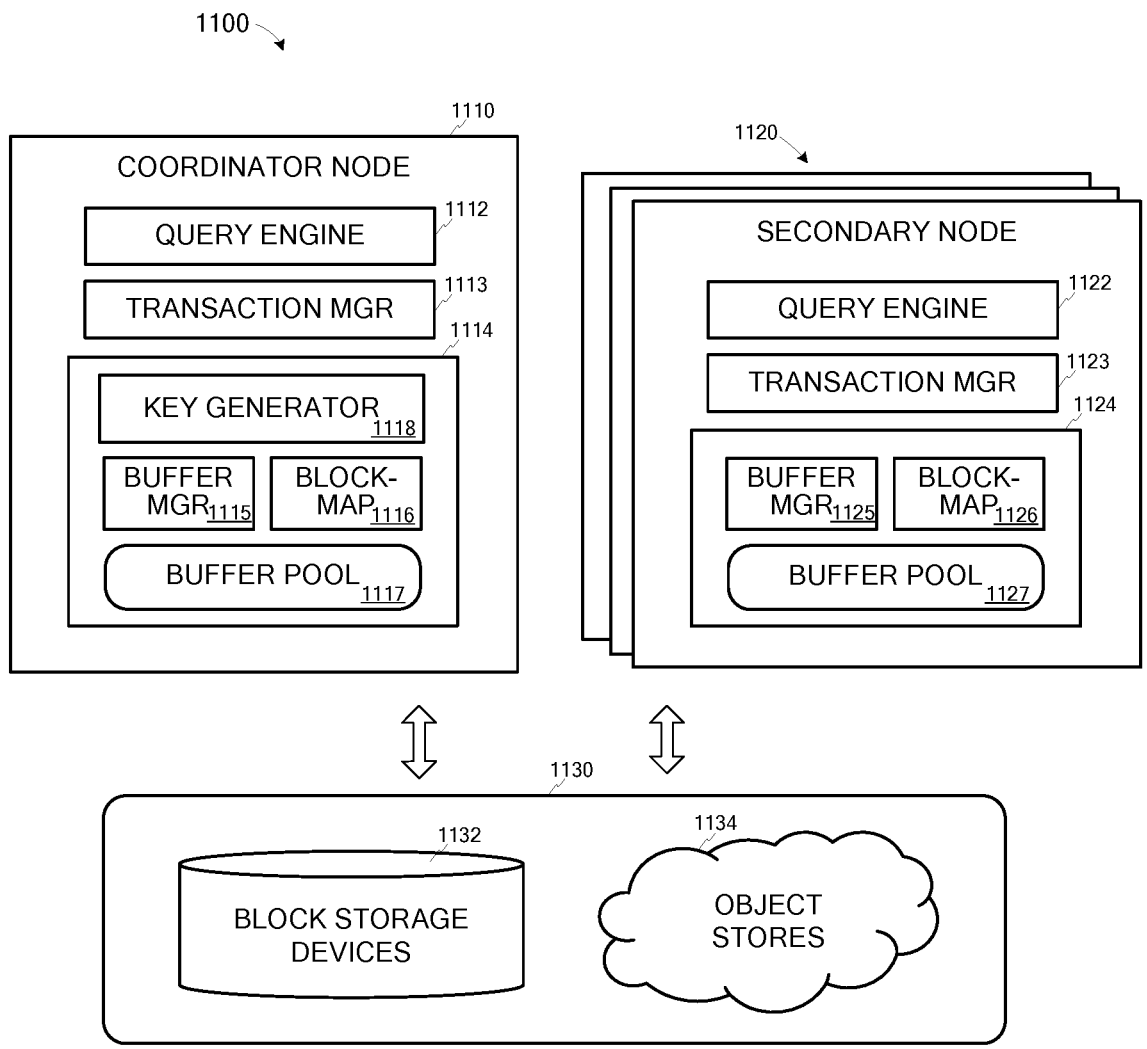
FIG. 11 is a block diagram of a page-based distributed relational database management system providing native block-based storage and cloud object storage according to some embodiments.

FIG. 11 is a block diagram of a distributed database 1100 according to some embodiments. Database 1100 comprises a cluster of distributed servers 1110 and 1120 to concurrently perform loads and queries in a scalable manner. System 1100 includes coordinator node 1110 and several secondary nodes 1120. A secondary node 1120 may comprise a writer node or a reader node. Embodiments may seamlessly add or remove one or more writer nodes and/or reader nodes as needed.

Writer secondary nodes 1120 and coordinator node 1110 are able to execute database updates, while reader nodes 1110 cannot. In some embodiments, writer nodes 1120 are used for Data Manipulation Language operations, and coordinator node 1110 is reserved primarily for Data Description Language operations. Database 1100 may implement MVCC with table-level versioning and snapshot isolation.

Unlike secondary nodes 1120, coordinator node 1110 includes object key generator 1118 and is responsible for generating object keys for use in database 1100. Requests to generate object keys may be received by coordinator node 1110 from writer secondary nodes 1120 via Remote Procedure Call (RPC) or may come from coordinator node 1110 itself. Reader secondary nodes 120 do not require object keys because reader secondary nodes 120 do not store pages in persistent storage.

Object key generator 1118 allocates object keys to requesting nodes in ranges and in a monotonically increasing fashion. For example, a secondary writer node 1120 may request 100 keys from coordinator node 1110. In response, coordinator node 1110 generates object keys 0-99, stores a record associating the range of object keys with the requesting secondary writer node 1120, and provides object keys 0-99 to the requesting secondary writer node 1120. The secondary writer node 1120 caches the allocated keys locally and may then consume the object keys in any desired manner, including not consuming some or all of the object keys. If another secondary writer node 1120 requests 100 keys from coordinator node 1110, coordinator node 1110 may generate object keys 100-199, store metadata associating the range of object keys with the other secondary writer node 1120, and provide object keys 100-199 to the other secondary writer node 1120.

Caching the allocated keys locally avoids a need to issue expensive RPC calls to coordinator node 1110 every time a new object key is needed. According to some embodiments, the number of keys requested (i.e., range size) by a node starts at a default value and dynamically increases or decreases on subsequent RPC calls based on the load on the node.

The RPC call from a secondary writer node 1120 to coordinator node 1110 initiates a new transaction on coordinator node 1110. This transaction includes recordation of the largest allocated object key in the transaction log, updating a data structure that maintains the object key ranges that have been handed out to secondary writer nodes (and to coordinator node 1110), and flushing the data structure to disk. Upon success, the transaction commits and the newly-allocated key range is returned to the requesting secondary node. This process ensures that after crash recovery, coordinator node 1110 may continue to allocate ranges of object keys in a strictly monotonically-increasing manner, and may perform accurate garbage collection.

If the request for a new range of object keys is initiated on coordinator node 1110, coordinator node 1110 does not make an RPC call on itself but performs the allocations directly within a transaction. Consequently, if coordinator node 1110 crashes, it is able to recover the maximum object key that was allocated across the cluster of servers by recovering the maximum object key that was stored in the transaction log since last checkpoint.

According to some embodiments, new versions of tables are created when transactions modify data. Older versions of a table continue to exist as long as transactions exist which still reference those versions. In conventional database systems using block storage devices solely for persistence, the transaction manager is tasked with determining that an older version of a table is no longer referenced, and subsequently deleting physical pages associated with the older version.

Some embodiments extend such a transaction manager to track pages stored on object stores and to appropriately delete those pages when no longer needed. These garbage collection events fall under two scenarios: (i) garbage collection of pages used by committed or rolled back transactions; and (ii) garbage collection in response to crashes of the coordinator node or a writer secondary node.

In the absence of coordinator node or writer secondary node crashes, the transaction manager relies on existing roll-forward/roll-back (RF/RB) bitmaps to determine which pages to delete from underlying object stores 1134. Each transaction is associated with its own pair of RF/RB bitmaps. The RF bitmap records the pages that have been marked for deletion by the transaction and the RB bitmap records the pages that have been allocated. In a block storage-only deployment, these bitmaps record the range of blocks that a page occupies on shared block storage as a sequence of 1-bits in the bitmap. In some embodiments, for a logical page associated with a cloud-based database space, the RF/RB bitmaps are used to record the object key as a single bit in the bitmap. Whether or not an RF/RB bitmap represents a sequence of physical block numbers or an object keys may be determined by simply examining the range in which a bit is recorded.

When a transaction rolls back, pages that are recorded in its RB bitmap can be deleted (from block storage or from object storage, depending on the bit range of the RB bitmap). When a transaction commits, however, the pages that have been marked for deletion by the transaction cannot be deleted right away because other transactions may still be accessing those pages in an MVCC system with snapshot isolation. Instead, when a transaction commits, its RF/RB bitmaps are flushed to storage, the identities of the bitmaps are recorded in the transaction log, and responsibility for garbage collection is passed onto the transaction manager.

In this regard, the transaction manager maintains a chain of committed transactions with pointers to the associated RF/RB bitmaps and tracks the oldest transaction in the chain whose pages are still referenced by active transactions in the distributed system. Once the transaction manager determines that pages of the oldest transaction in the chain are no longer referenced, the RF/RB bitmaps of the oldest transaction are used to determine persisted pages, including pages persisted on object stores, that can be deleted. Those pages are deleted and the oldest transaction is then dropped from the chain.

Garbage collection in response to coordinator node or writer node crashes attempts to address the following three requirements. First, if the coordinator node crashes, the metadata structures maintained by the object key generator (i.e., the maximum object key and the active sets of object keys handed out to secondary nodes) must be recovered to a consistent state. Next, if a node goes down, an active transaction may be aborted before its RF/RB bitmaps are persisted and, if so, the allocations performed by the aborted transaction must be undone without access to the RB bitmap. Finally, if an active set of object keys that are allocated by the coordinator node are not fully consumed by the recipient node at the time of the crash, stored objects corresponding to unconsumed object keys must be garbage collected.

The RF/RB bitmaps may be used to recover the active sets of object keys that have been handed out to secondary nodes. In a traditional block storage-only deployment, crash recovery starts from the last checkpoint, in which a copy of the freelist has been persisted, and applies the RF/RB bitmaps of all committed transactions to the freelist in order. Pages in the RF bitmap are removed from the freelist (i.e., deallocations are applied to the freelist), and the pages in the RB bitmap are marked as "in-use" in the freelist.

In the case of embodiments including pages persisted on cloud object stores, the RF/RB bitmaps are used to recover the active sets of object keys that have been handed out to secondary nodes. For example, table 1200 of FIG. 12 sets forth a sequence of events in a distributed system including a coordinator node and a writer node (i.e., $W_1$). The events involve three transactions $T_1$-$T_3$ and two crash points.

In the case of a crash on the coordinator node at clock 110, the transaction log is replayed from the checkpointed state which existed at clock 50. At the time of checkpoint, the active set of object keys was empty and replay therefore starts with an empty set of object keys. In the general case, the active set could contain object keys from prior allocation events.

The allocation event which occurred at clock 60 is replayed and the active set of object keys is reconstructed as $W_1$: {101-200}. When the commit of $T_1$ is replayed at clock 90, the active set is updated to $W_1$: {131-200} because the committed range of object keys {101-130} no longer needs to be tracked. There is no need for garbage collection of cloud-persisted objects because there were no active transactions on the coordinator node which were aborted by the crash.

The case of a writer node crash at clock 140 is now considered. If any active transactions existed on the writer node at the time of the crash, then the allocations performed by those transactions must be garbage collected since those transactions will never commit. Moreover, any outstanding allocations on the writer node must also be garbage collected.

Upon restart of the writer node at clock 150, the writer node makes an RPC call into the coordinator node to initiate the garbage collection process. When the coordinator node receives the RPC call, it determines the active set for writer node $W_1$ based on its stored metadata. Next, every object key in the active set $W_1$: {131-200} is polled for garbage collection. Every page associated with a polled object key in the object store is deleted.

According to the example, some pages having object keys in the range {151-160} may not have been flushed to the underlying object stores. Regardless, every page in the range will be polled by the coordinator node as a potential candidate for garbage collection. Furthermore, pages in the range {131-150} have already been garbage collected when $T_2$ rolled back but this information was not communicated to the coordinator node. Consequently, when node $W_1$ was restarted, the same range was polled for garbage collection. This process may be considered an optimization to reduce the amount of inter-node communication for transactions rolling back, which is expected to occur more frequently than node restarts.

As described above, storing pages directly on object stores may significantly reduce storage costs while benefiting from the elasticity and scale-out properties of object stores. However, I/O characteristics of object stores are different than those of conventional storage solutions such as hard disk drives or solid state drives. In particular, while object stores may allow for increased throughput, individual read and write operations may incur a higher latency than conventional storage solutions, negatively impacting query performance.

Figure 13:
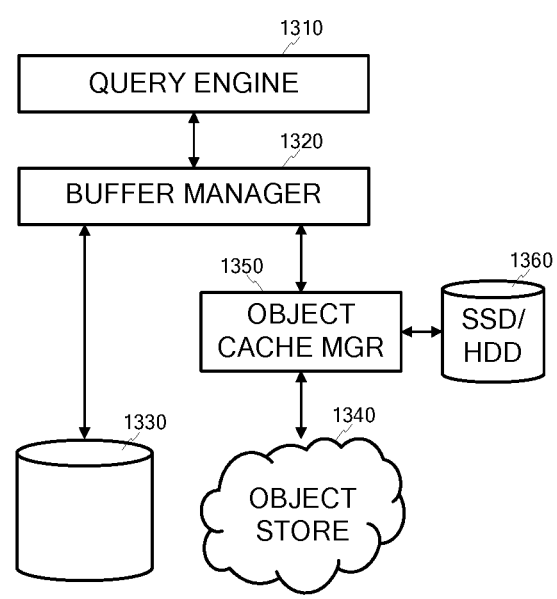
FIG. 13 is a block diagram of a page-based relational database management system using an object cache manager according to some embodiments.

FIG. 13 shows a database architecture including query engine 1310, buffer manager 1320, block storage device 1330 and object store 1340, each of which may be implemented to perform the functions described above. To counteract the impact of the high latency of object store 1340 without utilizing more random access memory (RAM), object cache manager 1350 is disposed between buffer manager 1320 and object store 1340. Object cache manager 1350 may be considered a disk-based extension to buffer manager 1320.

Each object cache manager 1350 uses a fast solid state drive (SSD) or hard disk drive (HDD) 1360 that is locally attached to the node. Latency on locally-attached SSD/HDD 1360 is significantly lower than an object store, and pricing thereof is more affordable than RAM. In a distributed environment, each node includes its own object cache manager (and associated SSD/HDD), and the objects cached by one object cache manager instance are not shared with another instance.

Object cache manager 1350 functions as a read and write cache. During a read, a page is first looked up by buffer manager 1320, which resides on RAM. If the page is not found, then the page is looked up by object cache manager 1350. If the page is found in object cache manager 1350, it is read from locally-attached storage 1360 and returned to the caller. If the page is not found, then object cache manager 1350 reads the page from underlying object store 1340, returns the page to the caller and asynchronously caches the new page in storage 1360 for future lookups. The page is cached also in RAM, in conventional buffer manager buffer manager 1320. Such read-through semantics significantly reduce the read latency for pages that are cached in object cache manager 1350 in comparison to the read latency for pages read from object store 1340.

Object cache manager 1350 supports write operations in write-back mode and write-through mode. In write-back mode, a page is synchronously written to locally-attached storage 1360 while being asynchronously written to object store 1340. The latency of the write operation in write-back mode is determined by the latency of locally-attached storage 1360 so the writes are relatively fast. In write-through mode, a page is synchronously written to object store 1340 while being cached asynchronously in locally-attached storage 1360. The latency of the write operation in the write-through mode is therefore determined by the latency of object store 1340 so writes are slower than in write-back mode.

Pages are therefore cached in object cache manager 1350 during both read and write operations. Object cache manager 1350 relies on a least-recently used eviction policy to create space in storage 1360 for new pages, which is aligned with a page eviction policy of buffer manager 1320. Object cache manager 1350 may maintain a single least-recently used list which represents both reads and writes, under the assumption that pages that have been written out or read more recently by object cache manager 1350 are more likely to be read again than other pages. Since, as described herein, a page that has been read through object cache manager 1350 cannot be written out again with the same object key, the caching of pages in object cache manager 1350 primarily benefits read operations. Furthermore, during a write-back operation, a page is not added to the least-recently used list maintained by object cache manager 1350 until the page has been successfully written to object store 1340. This requirement may prevent unnecessary accumulation of pages (i.e., pages of failed/rolled-back transactions) in storage 1360.

According to some embodiments, transactions interact with buffer manager 1320 in three phases: (i) warm-up; (ii) churn; and (iii) commit. In the warm-up phase, pages begin occupying the buffer pool in RAM. During the churn phase, the least-recently used pages are evicted from the buffer pool to create space for more recent pages. In the commit phase, buffer manager 1320 flushes out pages that have been dirtied by the committing transaction, including the pages residing in object cache manager 1350.

In an OLAP system, where long running transactions are normal and expected, the churn phase constitutes the longest period during a transaction. Optimization of the churn phase therefore takes precedence over optimization of the other two phases. For this reason, and to keep latency low, pages that are evicted from the buffer pool during the churn phase are written out using the write-back mode of object cache manager 135. During the commit phase, to ensure that the dirty pages are flushed out to object store 1340, object cache manager 1350 utilizes the write-through mode, which prioritizes writes to object store 134 over caching to the locally-attached storage 1360.

In the presence of multiple transactions, object cache manager 1350 prioritizes the write operations of committing transactions. A transaction indicates its desire to start the commit phase by sending a FlushForCommit signal to object cache manager 1350. Upon receiving this signal, object cache manager 1350 moves the dirty pages belonging to the committing transaction to the head of a write queue, thereby prioritizing all previously-started background jobs for that transaction. Object cache manager 1350 also changes its write mode from write-back to write-through. This change in write mode ensures that all subsequent write requests which come from the committing transaction are executed directly on object store 1340 as opposed to being treated as background jobs.

Object cache manager 1350 is intended as a performance optimization and therefore its presence or lack thereof does not affect transactional consistency. In the absence of object cache manager 1350, write operations are issued directly to object store 1340. Failed writes to object store 1340 are retried and, after a pre-determined number of failed writes of the same page, the corresponding transaction is rolled back. Eventually, the transaction manager garbage collects pages that belong to rolled-back transactions.

In the presence of object cache manager 1350, write operations take two forms as described above: (i) writes to storage 1360 for caching; and (ii) writes directly to object store 1340. If a write to storage 1360 fails, the error is ignored and the page is written directly to object store 1340. If a write to object store 1340 fails, the transaction is rolled back after a pre-determined number of retries as described above.

If encryption is enabled, buffer manager 1320 provides pages to object cache manager 1350 in encrypted form and decrypts pages read from object cache manager 1350. Consequently, the pages that are cached in storage 1360 and the pages that are persisted on object store 1340 are encrypted.

Traditional solely file-based relational database management systems support numerous types of backup scenarios (e.g., full, incremental backups, incremental since full, virtual and decoupled) to provide fault-tolerance in case of software or hardware failure. In contrast, most object stores provide native fault-tolerance in the form of replication, thus relieving the burden of providing fault-tolerance from relational database management systems. Embodiments may therefore leverage properties of cloud-based object stores to support (i) frequent and near-instantaneous snapshots, and (ii) reversion to a consistent snapshot using point-in-time restore. Such support may be provided in addition to the above-mentioned traditional file-based backup scenarios.

To support frequent and near-instantaneous snapshots, the deletion of pages from object stores is deferred for a user-defined retention period. This deferral capitalizes on the relatively inexpensive storage provided by cloud-based object stores.

Figure 14:
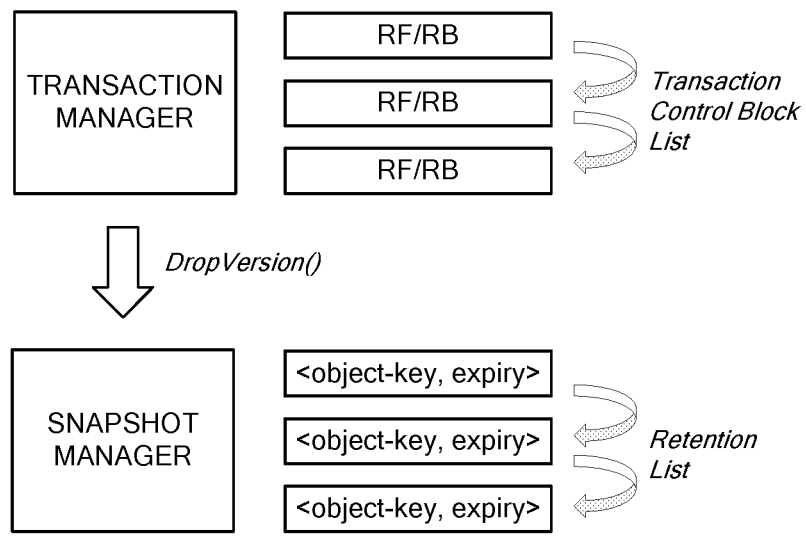
FIG. 14 is a block diagram illustrating snapshot management according to some embodiments.

Traditionally, the transaction manager is responsible for determining that a version of a table is no longer referenced, and, in response to the determination, for deleting the physical pages associated with that version. According to some embodiments, if the transaction manager determines that a version of a page associated with a cloud-based database space is no longer referenced, the page is not deleted from the object store and ownership of the page is transferred to the snapshot manager as illustrated in FIG. 14. The snapshot manager is then responsible for permanently deleting the page in a background process when a user-defined retention period (e.g., two months) for that page expires. Since ownership of different pages is transferred to the snapshot manager at different points in time, the snapshot manager maintains a first-in-first-out list containing a record (object-key, expiry) for each page transferred thereto. The records may be used to identify a page which should be deleted from an object store (i.e., expiry>current time) and to delete the page from the object store (i.e., using the associated object-key). The first-in-first-out list is stored on object stores and pruned as pages are permanently deleted.

According to embodiments such as that illustrated in FIG. 14 and described above, taking a snapshot involves backing up the first-in-first-out list of the snapshot manager, and taking a full backup of the system catalog and all file-based database spaces including the system database space. Due to the retention of cloud-stored pages by the snapshot manager, taking the snapshot does not require backing up of cloud-based database spaces. The data backed up during a snapshot operation is automatically deleted by the snapshot manager when the snapshot expires (i.e., when the retention period for that snapshot ends).

Taking a snapshot can be near-instantaneous in the case of a database instance in which all user database spaces are cloud-based. In such a case, only the system database space needs to be backed up in full, and the system database space is significantly smaller than in a traditional database instance due to the reduced role of the freelist. Consequently, even frequent snapshots will present a minimal burden on processing resources.

To restore a database from a snapshot that was taken within the retention period, it is sufficient to restore the first-in-first-out list of the snapshot manager, the system catalog, the system database space and any file-based database spaces. The blockmap pages and data pages of cloud-based database spaces that are referenced by the identity objects in the system catalog are already retained in the underlying object stores. After the restore, the database will no longer need any pages that have been created between the snapshot and the restore operations. Since the object key generator provides object keys in a monotonically increasing fashion, the range of object keys to be garbage collected after the restore can be computed from the object keys used during the snapshot operation (which are recorded in metadata that is stored during taking of the snapshot) and the restore operation.

Figure 15:
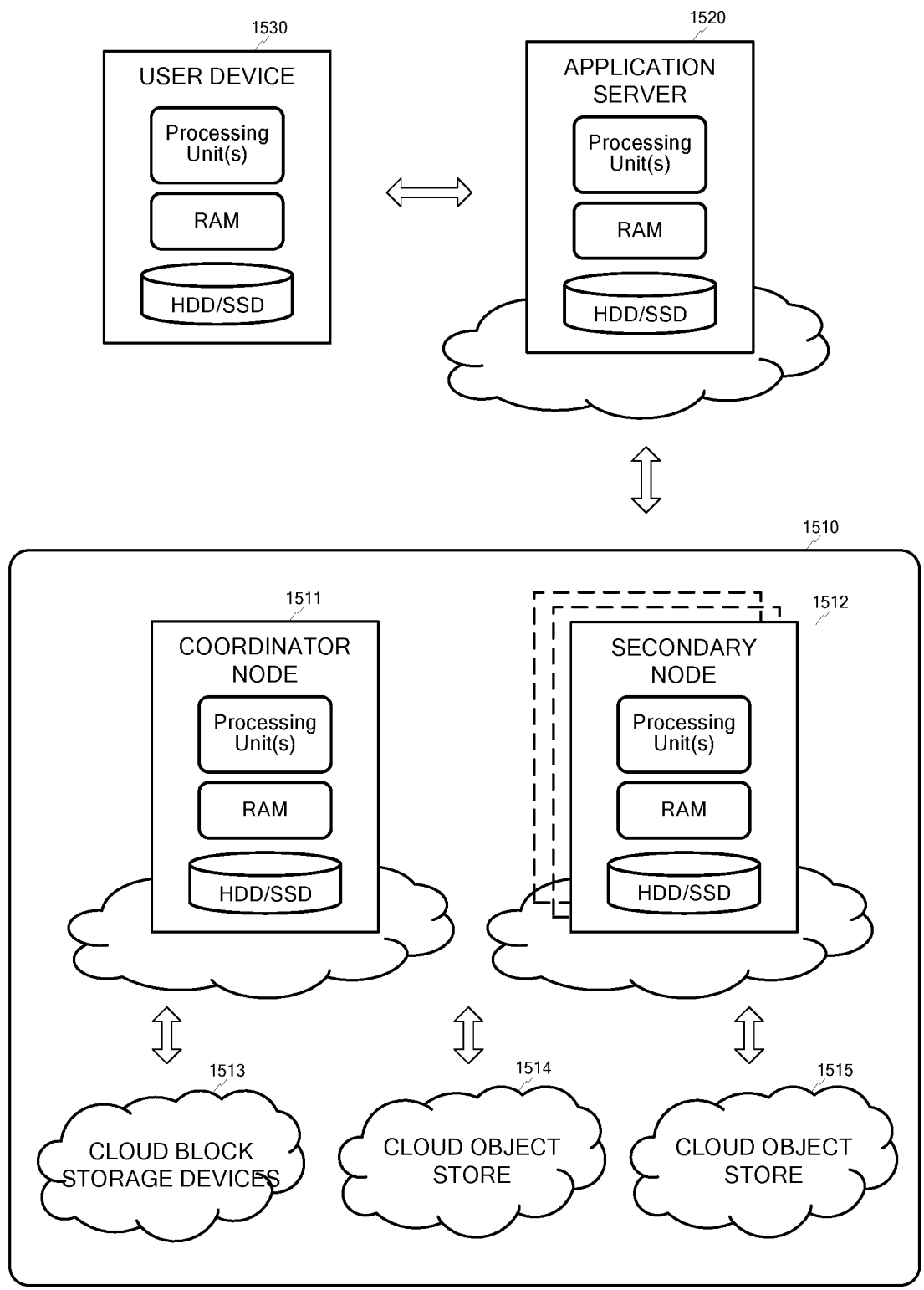
FIG. 15 is a block diagram of cloud implementation according to some embodiments.

FIG. 15 illustrates a cloud-based database deployment according to some embodiments. The illustrated components may reside in one or more public clouds providing self-service and immediate provisioning, autoscaling, security, compliance and identity management feature.

Database system 1510 includes coordinator node 1511, secondary nodes 1512, cloud-based block storage devices 1513 and cloud object stores 1514 and 1515. As described herein, nodes 1511 and 1512 may operate to persist pages of file-based database spaces to cloud-based block storage devices 1513 and pages of cloud-based database spaces to cloud object stores 1514 and 1515.

Each of coordinator node 1511 and secondary nodes 1512 may comprise a cloud-based compute resource, such as a virtual machine, provided by a public cloud provider. Cloud-based block storage devices 1513 may comprise reserved block storage devices for use by any of nodes 1511 and 1512, and cloud object stores 1514 and 1515 may comprise key-value object stores as described herein. Two or more nodes or data stores may be provided by different public cloud providers.

Application server 1520 may also comprise a cloud-based compute resource allocated by a public cloud provider. As such, application server 1520 may also exhibit demand-based elasticity. User device 1530 may interact with applications executing on application server 1520, for example via a Web Browser executing on user device 1530, in order to create, read, update and delete data managed by database management system 1510.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
   a memory storing executable program code; and
   a processing unit to execute the program code to cause the system to:
   determine a first logical page number of a first page to be persisted;
   identify a first blockmap page associated with the first logical page number;
   determine, from the first blockmap page, a block number associated with the first logical page number;
   determine that the block number is an object key, where the object key is associated with a first object stored in an object store;
   in response to the determination that the block number is the object key, determine a first object key to associate with the first logical page number, the first object key being different from the object key; and
   write the first page to the object store as a second object using the first object key.

2. The system according to claim 1, the processing unit to execute the program code to cause the system to:
   update the first blockmap page to associate the first object key with the first logical page number.

3. The system according to claim 1, the processing unit to execute the program code to cause the system to:
   determine a second logical page number of a second page to be persisted;
   identify a second blockmap page associated with the second logical page number;
   determine, from the second blockmap page, a second block number associated with the second logical page number;
   determine that the second block number is associated with a block of a block storage device; and
   in response to the determination that the second block number is associated with the block of the block storage device, write the second page to the block of the block storage device.

4. The system according to claim 3, wherein determination that the block number is an object key comprises a determination that the block number is in a range associated with object keys of object stores, and
   wherein determination that the second block number is associated with a block of a block storage device comprises a determination that the second block number is in a range associated with blocks of block storage devices.

5. The system according to claim 3, wherein the first blockmap page is associated with a first blockmap of a first database space, and wherein the second blockmap page is associated with a second blockmap of a second database space.

6. The system according to claim 1, further comprising a locally-attached non-volatile memory device, wherein writing of the first page to the object store using the first object key comprises writing of the first page synchronously to the locally-attached non-volatile memory device and writing of the first page asynchronously to the object store using the first object key.

7. The system according to claim 1, further comprising a locally-attached non-volatile memory device, wherein writing of the first page to the object store using the first object key comprises writing of the first page asynchronously to the locally-attached non-volatile memory device and writing of the first page asynchronously to the object store using the first object key.

8. A method comprising:
   determining a first logical page number of a first page to be persisted;
   identifying a first blockmap page associated with the first logical page number;
   determining, based on the first blockmap page, a block number associated with the first logical page number;
   determining that the block number is an object key, where the object key is associated with a first object stored in an object store;
   in response to determining that the block number is the object key, determining a first object key to associate with the first logical page number, the first object key being different from the object key; and
   writing the first page to an object store as a second object using the first object key.

9. The method according to claim 8, further comprising:
   updating the first blockmap page to associate the first object key with the first logical page number.

10. The method according to claim 8, further comprising:
    determining a second logical page number of a second page to be persisted;
    identifying a second blockmap page associated with the second logical page number;

determining, based on the second blockmap page, a second block number associated with the second logical page number;

determining that the second block number is associated with a block of a block storage device; and in response to determining that the second block number is associated with the block of the block storage device, writing the second page to the block of the block storage device.

11. The method according to claim 10, wherein determining that the block number is an object key comprises determining that the block number is in a range associated with object keys of object stores, and wherein determining that the second block number is associated with a block of a block storage device comprises determining that the second block number is in a range associated with blocks of block storage devices.

12. The method according to claim 10, wherein the first blockmap page is associated with a first blockmap of a first database space, and wherein the second blockmap page is associated with a second blockmap of a second database space.

13. The method according to claim 8, wherein writing the first page to the object store using the first object key comprises writing the first page synchronously to a locally-attached non-volatile memory device and writing the first page asynchronously to the object store using the first object key.

14. The method according to claim 8, wherein writing the first page to the object store using the first object key comprises writing the first page asynchronously to a locally-attached non-volatile memory device and writing the first page asynchronously to the object store using the first object key.

15. A database system comprising:
a block storage device;
a cloud object store; and
a server node comprising a memory storing processor-executable program code and a processing unit to execute the program code to cause the database system to:
determine a first logical page number of a first database page to be persisted;
identify a first blockmap page associated with the first logical page number;
determine, based on the first blockmap page, a block number associated with the first logical page number;
determine that the block number is an object key, where the object key is associated with a first object stored in the cloud object store;
in response to the determination that the block number is the object key, determine a first object key to associate with the first logical page number, the first object key being different from the object key; and
write the first database page to the cloud object store as a second object using the first object key.

16. The database system according to claim 15, the server node to update the first blockmap page to associate the first object key with the first logical page number.

17. The database system according to claim 15, the server node to:
determine a second logical page number of a second database page to be persisted;
identify a second blockmap page associated with the second logical page number;
determine, based on the second blockmap page, a second block number associated with the second logical page number;
determine that the second block number is associated with a block of the block storage device; and
in response to the determination that the second block number is associated with the block of the block storage device, write the second database page to the block of the block storage device.

18. The database system according to claim 17, wherein determination that the block number is an object key comprises a determination that the block number is in a range associated with object keys of object stores, and
wherein determination that the second block number is associated with a block of a block storage device comprises a determination that the second block number is in a range associated with blocks of block storage devices.

19. The database system according to claim 15, further comprising a locally-attached non-volatile memory device, wherein writing of the first database page to the object store using the first object key comprises writing of the first database page synchronously to the locally-attached non-volatile memory device and writing of the first database page asynchronously to the object store using the first object key.

20. The database system according to claim 15, further comprising a locally-attached non-volatile memory device, wherein writing of the first database page to the object store using the first object key comprises writing of the first database page asynchronously to the locally-attached non-volatile memory device and writing of the first database page asynchronously to the object store using the first object key.

* * * * *